(12) United States Patent
Taubman

(10) Patent No.: US 6,995,796 B2
(45) Date of Patent: Feb. 7, 2006

(54) IMAGE SENSOR FOR DIGITAL CAMERAS

(75) Inventor: David S. Taubman, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 10/054,201

(22) Filed: Nov. 13, 2001

(65) Prior Publication Data

US 2002/0149686 A1    Oct. 17, 2002

Related U.S. Application Data

(63) Continuation of application No. 09/009,426, filed on Jan. 20, 1998.

(51) Int. Cl.
*H04N 5/335* (2006.01)

(52) U.S. Cl. ..................................... 348/280; 348/279

(58) Field of Classification Search ........... 348/207.99, 348/262, 272, 273, 278, 279, 280, 281, 222.1; 382/166
See application file for complete search history.

(56) References Cited

U.S. PATENT DOCUMENTS 5,889,554 A    3/1999 Mutze
6,134,347 A *  10/2000 Niwamoto .................. 382/166

* cited by examiner

*Primary Examiner*—Tuan Ho

(57) ABSTRACT

An apparatus for recording an image. The apparatus includes a two-dimensional array of image sensors. Each image sensor provides a measurement of the light intensity in a selected spectral region. The two-dimensional array is generated from a plurality of identical blocks of sensors, the blocks being juxtaposed to form the array. Each of the blocks has equal numbers of sensors for each of the spectral regions, the number of different spectral regions being at least three. The sensors in the blocks are arranged in a two-dimensional array having a plurality of rows and columns. The sensors in the blocks are arranged such that any straight line passing through a given sensor also passes through sensors of at least three different colors whose spectral responses are all linearly independent. In the preferred embodiment of the present invention, all three such sensors lie within a disk, centered at the first sensor and having a radius no larger than five times the center to center spacing of the blocks in the sensor array. In the preferred embodiment of the present invention, each of the sensors corresponding to one of the selected spectral regions in blocks not adjacent to an edge of the two-dimensional array is adjacent to a sensor corresponding to the same spectral region.

8 Claims, 3 Drawing Sheets

FIGURE 2

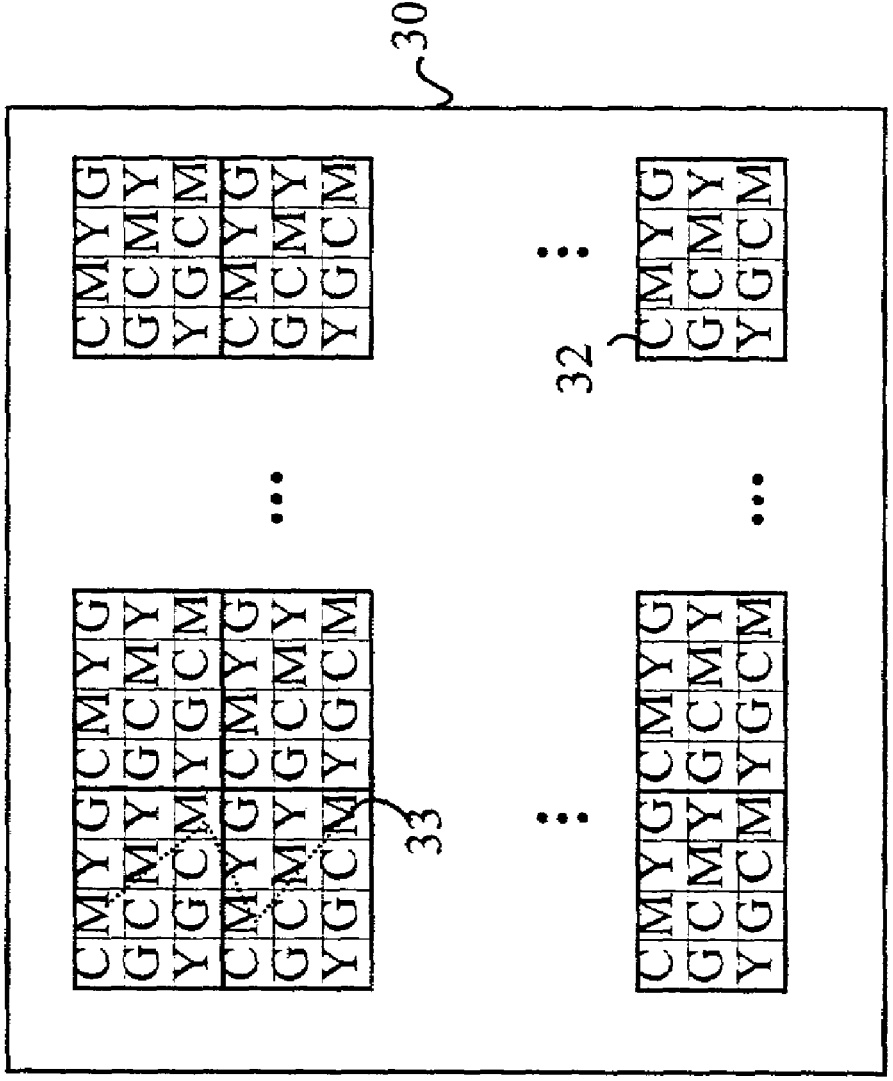

IMAGE SENSOR FOR DIGITAL CAMERAS

This is a request for filling a continuing application under 37 CRF 1.53(b) a continuation application of Application Ser. No. 09/009,426 filed Jan. 20, 19988.

FIELD OF THE INVENTION

The present invention relates to digital cameras, and more particularly, to an improved design for a color sensor array for use in digital cameras and the like.

BACKGROUND OF THE INVENTION

A digital color image usually consists of an array of pixel values representing the intensity of the image at each point on a regular grid. Typically, three colors are used to generate the image. At each point on the grid the intensity of each of these colors is specified, thereby specifying both the intensity and color of the image at that grid point.

Conventional color photography records the relevant image data by utilizing three overlapping color sensing layers having sensitivities in different regions of the spectrum (usually red, green, and blue). Digital cameras, in contrast, typically utilize one array of sensors in a single "layer".

When only one sensor array is used to detect color images, only one color may be detected at any given sensor location. As a result, these sensors do not produce a color image in the traditional sense, but rather a collection of individual color samples, which depend upon the assignment of color filters to individual sensors. This assignment is referred to as the color filter array (CFA) or the color mosaic pattern. To produce a true color image, with a full set of color samples (usually red, green and blue) at each sampling location, a substantial amount of computation is required to estimate the missing information, since only a single color was originally sensed at each location in the array.

There are a wide variety of approaches to the reconstruction problem, which is frequently referred to as the "demosaicing" task. The performance of all such algorithms depends upon the nature of the underlying CFA pattern. One such pattern is taught in U.S. Pat. No. 3,971,065. This pattern is generated by a repeating 2×2 kernel, containing two green sensors, one red sensor and one blue sensor, as illustrated below:

| CFA | G | B | G | B | G | B | G | B | Kernel | G | B |
|-----|---|---|---|---|---|---|---|---|--------|---|---|
|     | R | G | R | G | R | G | R | G |        | B | R |
|     | G | B | G | B | G | B | G | B |        |   |   |
|     | R | G | R | G | R | G | R | G |        |   |   |
|     | G | B | G | B | G | B | G | B |        |   |   |
|     | R | G | R | G | R | G | R | G |        |   |   |

It should be noted that this pattern has twice as many sensors in the green region of the spectrum as it does in the blue or red regions of the spectrum. The proponents of this pattern justify this choice on the grounds that the Human Visual System (HVS) is more sensitive to green. In addition, the proponents of this scheme point to the fact that it leads to relatively simple demosaicing algorithms. Specifically, if one color channel is sampled more densely than the rest, it can be interpolated most easily and then used to guide the interpolation of the less densely sampled color channels.

The argument that the HVS is more sensitive to the green portion of the spectrum is fundamentally flawed when applied to digital camera systems. The reason the human eye can afford to have more green cones than red cones, and many fewer blue cones, is that the eye's optics effectively low-pass filter the red and blue parts of the spectrum more severely than the green. Hence, the eye cannot effectively utilize additional samples in the red and blue regions of the spectrum. In effect, the eye has poor spatial resolution for images in the red and blue regions of the spectrum.

Digital cameras, in contrast, do not suffer from this limitation; hence, there is no logical reason for limiting the sampling density at any wavelength. If the sampling density in any of the color channels is reduced, there will be an increased ambiguity between spatial intensity variations and color composition of the original scene. Since such ambiguities are to be avoided, sampling densities in each of the colors should be the same.

Another problem with the small 2×2 kernel described above lies in its inability to discern color and spatial variations on image components whose spatial dimensions are small compared to the kernel's size. Consider a narrow red line (less than one sensor in width) running vertically through the image. If the line is positioned such that it is over the column of sensors having only blue and green sensors, the system will have difficulty detecting the line. In fact, if neither the blue or green sensors have at least some response in the red region of the spectrum, the line cannot be detected at all. Needless to say, accurately determining the color of this line would be difficult.

Small kernels also can present problems in demosaicing scenes having textures. Consider an image feature that is on the order of the size of the kernel. Demosaicing algorithms have difficulty determining whether the resultant sensor pattern corresponds to a smooth area in the scene with saturated color or a textured region having rapidly varying intensity of a more neutral color.

Hence, the size of the kernel should be relatively large, to assure that scene textures do not give the appearance of color variations. It should be noted, however, that there is a limit on the size of the kernel. As the kernel size grows, the implementation cost of the demosaicing algorithm typically increases. Hence, a tradeoff between cost and image quality is generally implied.

It should also be noted that images of interest to humans often include linear edges as well as lines. Hence, the sensor pattern should be designed so as to ensure that any linear feature in the image always passes through sensors of every color type. Furthermore, the distance along the linear feature between color sensors of the same type should be as small as possible. Failure to satisfy this requirement results in color ambiguity at the edges of objects in the image.

The 2×2 pattern described above is clearly a poor choice in light of these requirements. First, it has a very small kernel. Second, it undersamples two of the color channels. Third, the red and blue sensors are never adjacent to sensors of the same color. Finally, horizontal and vertical linear features never pass through all three of the sensor types.

One prior art solution to the above problems utilizes large kernels containing pseudo-random distributions of the different sensor colors to minimize the likelihood that textures will induce colors in the demosaiced image. However, such pseudo-random patterns introduce other problems. In addition to increasing the computational costs of demosaicing the image, there are regions in which there is too great a distance between color sensors of the same color in a region of the image. This can make it difficult for the demosaicing algorithm to distinguish between spatial intensity variations and color variations when it attempts to reconstruct a full color image.

Broadly, it is the object of the present invention to provide an improved color image sensor array.

It is a further object of the present invention to provide an image sensor based on a kernel that is larger than the 2×2 kernel described above.

It is yet another object of the present invention to provide an image sensor in which linear features pass through sensors for at least three different colors, whose spectral responses are linearly independent.

It is a still further object of the present invention to provide an image sensor in which color sensors for the same color are located adjacent to one another to minimize ambiguities introduced by rapidly changing intensity patterns in the image.

These and other objects of the present invention will become apparent to those skilled in the art from the following detailed description of the invention and the accompanying drawings.

SUMMARY OF THE INVENTION

The present invention is an apparatus for recording an image. The apparatus includes a two-dimensional array of image sensors. Each image sensor provides a measurement of the light intensity in a selected spectral region. The two-dimensional array is generated from a plurality of identical blocks of sensors, the blocks being juxtaposed to form the array. Each of the blocks has equal numbers of sensors for each of the spectral regions, the number of different spectral regions being at-least three. The sensors in the blocks are arranged in a two-dimensional array having a plurality of rows and columns. The sensors in the blocks are arranged such that any straight line passing through a given sensor also passes through sensors of at least three different colors whose spectral responses are all linearly independent. In the preferred embodiment of the present invention, all three such sensors lie within a disk, centered at the first sensor and having a radius no larger than five times the center to center spacing of the blocks in the sensor array. In the preferred embodiment of the present invention, each of the sensors corresponding to one of the selected spectral regions in blocks not adjacent to an edge of the two-dimensional array is adjacent to a sensor corresponding to the same spectral region.

BRIEF DESCRIPTION OF THE DRAWINGS

FIG. 2 is a top view of another embodiment of an image sensor according to the present invention.

FIG. 3 is a top view of a third embodiment of an image sensor according to the present invention.

DETAILED DESCRIPTION OF THE INVENTION

Figure 1:
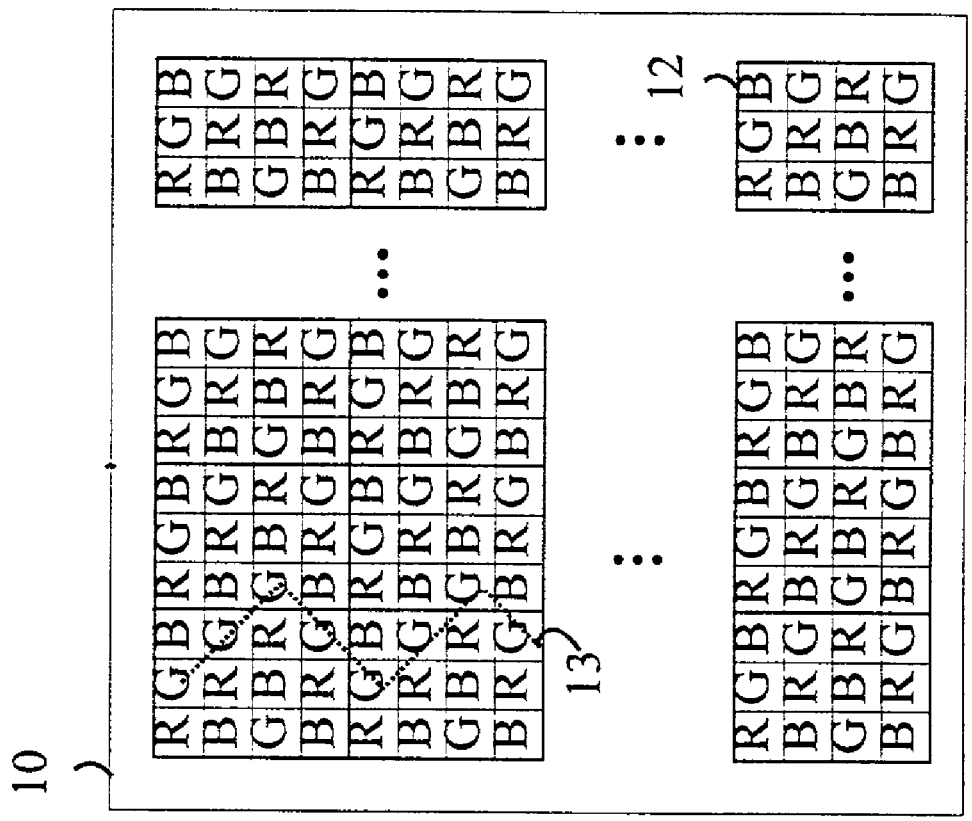
FIG. 1 is a top view of an image sensor according to the present invention.

Refer now to FIG. 1 which is a top view of a color image sensor 10 according to the present invention that is based on a 4×3 replicating kernel, consisting of horizontally shifted rows of alternating red, green and blue sensors, as depicted at 12.

The CFA pattern utilized in sensor 10 is a zigzag pattern in which each of the red, green and blue channels may be traced in a zigzag fashion from the top of the array to the bottom. A portion of the zigzag pattern for one set of green sensors is shown at 13. The zigzag nature ensures that linear image features cannot pass through a subset of the sensors, which excludes one or more of the color channels.

It should also be noted that a sensor for one of the colors is adjacent to two other sensors of that color throughout the CFA for pixels away from the edges of the array. This feature of the pattern makes it easier for the demosaicing algorithm to determine if a rapidly changing feature is the result of a change in color or a change in intensity (i.e., a texture).

Figure 2:
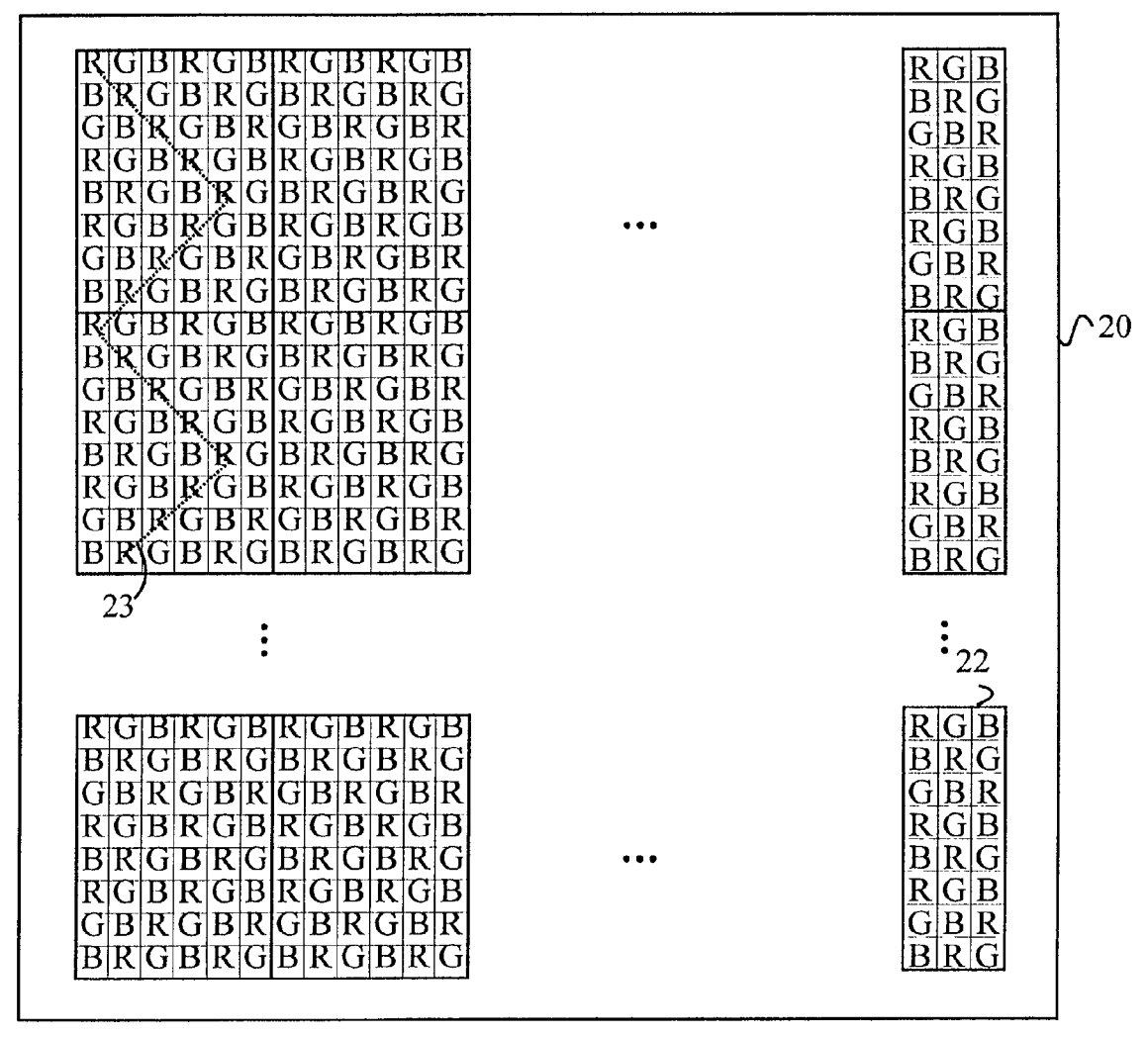

Other members of the same class of zigzag patterns may be generated by adjusting the size and arrangement of the rows of the kernel to alter the nature of the zigzag. For example, the pattern might shift to the right for five consecutive rows, before it reverses and shifts to the left for the next five rows and so on. A sensor with this pattern is shown in FIG. 2 at 20. Sensor 20 is constructed from a 3×8 kernel shown at 22. The zigzag pattern has linear segments that extend for 5 pixels before changing direction as shown at 23.

In general, the pattern need not be a zigzag and the number of color sensors is not restricted to three. For example, a sensor according to the present invention based on a CMYG (cyan, magenta, yellow, and green) color scheme is shown in FIG. 3 at 30. The kernel in this case is a 3×4-pixel array shown at 32. This pattern shifts to the right for 3 consecutive rows, and then jumps two rows to the left to repeat itself. The zigzag patterns and this latter pattern have in common the property that they are all generated by cyclic permutations of a row containing equal numbers of all color sensors. It will be obvious to those skilled in the art from the preceding discussion that the same strategy may be applied to a column.

These patterns have 4 beneficial properties. First, the pattern is generated by replicating a relatively small kernel. This simplifies the mathematical operations involved in demosaicing algorithms based on linear models that take into account various distortions introduced by lens, color responses, etc.

Second, as any linear boundary in the image is traversed, the boundary repeatedly passes through color sensors of at least three linearly independent colors over a relatively short distance along the length of the boundary. This provides the data needed to distinguish color variations from textural variations along the boundary. Since the human eye is particularly sensitive to linear edges, this feature provides substantial benefits. The distance that must be traversed along the linear boundary before passing over pixels of all of the different colors depends on the orientation of the linear boundary and the particular kernel. In the preferred embodiment of the present invention, the kernel is chosen such that any line which passes through the center of a disk whose radius is five times the distance between the centers of two adjacent kernels will pass through at least three colors whose spectral responses are linearly independent within that disk.

Third, within the body of the pattern, each pixel of any given color is adjacent to other pixels of that color. This provides the data needed to distinguish color variations from textural variations within more general images.

Fourth, the kernel has equal numbers of color sensors of each color. This assures that all colors are sampled with the same density in the resulting CFA pattern. This, in turn, helps to ensure good image quality over a wide range of different scene illumination conditions, from incandescent lighting through to illuminants that are heavily biased toward the blue end of the spectrum.

The above embodiments of the present invention have been described in terms of sensors for specific portions of the spectrum. However, it will be apparent to those skilled in the art from the preceding discussion that other choices of spectral regions may be utilized without deviating from the teachings of the present invention.

Various modifications to the present invention will become apparent to those skilled in the art from the foregoing description and accompanying drawings. Accordingly, the present invention is to be limited solely by the scope of the following claims.

What is claimed is:

1. An apparatus for recording an image, said apparatus comprising a two-dimensional array of sensors each for detecting light intensity in one of at least three distinct spectral regions, the array comprising at least one block of sensors, each block having equal numbers of sensors corresponding to each of the distinct spectral regions, wherein the sensors in the at least one block are arranged such that any linear path within the array passing through a first sensor, passes through sensors corresponding to each of the at least three distinct spectral regions, wherein the number of different spectral regions is 3, the spectral regions being denoted by R(red), G(green), and B(blue), and the sensors are arranged in a cyclic pattern of permutations of rows or columns, wherein the pattern of rows and columns comprises four rows and three columns, wherein a first row of the pattern orders the sensors having a R sensor first, a G sensor second, and a B sensor third, a second row of the pattern orders the sensors having a B sensor first, a R sensor second, and a G sensor third, a third row of the pattern orders the sensors having a G sensor first, a B sensor second, and a R sensor third, and a fourth row of the pattern orders the sensors having a B sensor first, a R sensor second, and a G sensor third.

2. The apparatus of claim 1 wherein the linear path passes through the sensors corresponding to the at least three distinct spectral regions within a disk, centered at the first sensor and having a radius not larger than five times the center to center spacing of the block of sensors.

3. The apparatus of claim 1 wherein each of the sensors corresponding to one of the spectral regions in blocks not adjacent to an edge of the two-dimensional array is adjacent to a sensor corresponding to the same spectral region.

4. The apparatus of claim 1 wherein the number of different spectral regions is 4, the spectral regions being denoted by C(cyan), M(magenta), Y(yellow), and G(green), and the sensors are arranged in a cyclic pattern of permutations of rows or columns.

5. An apparatus for recording an image, said apparatus comprising a two-dimensional array of sensors each for detecting light intensity in one of at least three distinct spectral regions, the array comprising at least one block of sensors, each block having equal numbers of sensors corresponding to each of the distinct spectral regions, wherein the sensors in the at least one block are arranged such that any linear path within the array passing through a first sensor, passes through sensors corresponding to each of the at least three distinct spectral regions, wherein the pattern of rows and columns comprises three rows and four columns, wherein a first row of the pattern orders the sensors having a C sensor first, a M sensor second, a Y sensor third, and a G sensor fourth, a second row of the pattern orders the sensors having a G sensor first, a C sensor second, a M sensor third, and a Y sensor fourth, and a third row of the pattern orders the sensors having a Y sensor first, a G sensor second, a C sensor third, and a M sensor fourth.

6. The apparatus of claim 5 wherein the linear path passes through the sensors corresponding to the at least three distinct spectral regions within a disk, centered at the first sensor and having a radius not larger than five times the center to center spacing of the block of sensors.

7. The apparatus of claim 5 wherein each of the sensors corresponding to one of the spectral regions in blocks not adjacent to an edge of the two-dimensional array is adjacent to a sensor corresponding to the same spectral region.

8. The apparatus of claim 5 wherein the number of different spectral regions is 4, the spectral regions being denoted by C(cyan), M(magenta), Y(yellow), and G(green), and the sensors are arranged in a cyclic pattern of permutations of rows or columns.

* * * * *